United States Patent
Dai et al.

(10) Patent No.: US 8,587,160 B2
(45) Date of Patent: Nov. 19, 2013

(54) GRID FAULT RIDE-THROUGH FOR CURRENT SOURCE CONVERTER-BASED WIND ENERGY CONVERSION SYSTEMS

(75) Inventors: Jingya Dai, Toronto (CA); David Dewei Xu, Pickering (CA); Bin Wu, Toronto (CA); Navid Zargari, Cambridge (CA)

(73) Assignee: Rockwell Automation Technologies, Inc., Mayfield Heights, OH (US)

( * ) Notice: Subject to any disclaimer, the term of this patent is extended or adjusted under 35 U.S.C. 154(b) by 481 days.

(21) Appl. No.: 12/776,118

(22) Filed: May 7, 2010

(65) Prior Publication Data

US 2011/0057444 A1 Mar. 10, 2011

Related U.S. Application Data

(60) Provisional application No. 61/239,949, filed on Sep. 4, 2009.

(51) Int. Cl.
*G05F 3/02* (2006.01)
(52) U.S. Cl.
USPC .......................................................... 307/151
(58) Field of Classification Search
USPC .......................................................... 307/151
See application file for complete search history.

(56) References Cited

U.S. PATENT DOCUMENTS

| | | | |
|---|---|---|---|
| 3,757,197 A | 9/1973 | Bailey | |
| 4,276,589 A | 6/1981 | Okawa et al. | |
| 4,496,899 A | 1/1985 | Lippitt et al. | |
| 4,545,002 A | 10/1985 | Walker | |
| 4,780,802 A * | 10/1988 | Miyashita et al. | 363/37 |
| 4,833,389 A | 5/1989 | Kovalsky et al. | |
| 4,870,338 A | 9/1989 | Abbondanti | |
| 5,005,115 A | 4/1991 | Schauder | |
| 5,041,959 A | 8/1991 | Walker | |
| 5,083,039 A | 1/1992 | Richardson et al. | |
| 5,764,023 A * | 6/1998 | Wieloch | 318/803 |
| 5,798,632 A | 8/1998 | Muljadi | |
| 7,312,537 B1 | 12/2007 | Walling | |
| 7,432,686 B2 | 10/2008 | Erdman et al. | |
| 7,462,946 B2 | 12/2008 | Wobben | |
| 7,495,410 B2 * | 2/2009 | Zargari et al. | 318/729 |
| 7,508,094 B2 * | 3/2009 | Johnson et al. | 307/64 |
| 7,511,385 B2 | 3/2009 | Jones et al. | |
| 7,595,563 B2 | 9/2009 | Wobben | |
| 7,656,052 B2 | 2/2010 | Jones et al. | |
| 7,663,260 B2 | 2/2010 | Kabatzke et al. | |
| 7,679,208 B1 | 3/2010 | Ko et al. | |
| 7,692,321 B2 * | 4/2010 | Jones et al. | 290/43 |
| 7,692,325 B2 | 4/2010 | Ichinose et al. | |
| 7,746,024 B2 * | 6/2010 | Rozman et al. | 318/722 |
| 7,755,209 B2 * | 7/2010 | Jones et al. | 290/44 |
| 7,816,798 B2 | 10/2010 | Hehenberger | |
| 7,898,099 B2 * | 3/2011 | Stiesdal | 290/44 |
| 8,030,791 B2 * | 10/2011 | Lang et al. | 290/44 |
| 8,093,740 B2 * | 1/2012 | Oohara et al. | 290/44 |

(Continued)

*Primary Examiner* — Adi Amrany
(74) *Attorney, Agent, or Firm* — Fay Sharpe LLP; Alexander Kuszewski; John M. Miller

(57) ABSTRACT

Current source converter (CSC) based wind energy power conversion systems (WECS) and methods are presented in which a unified DC link current control scheme is employed to facilitate grid fault ride-through conditions, with a multiple-mode converter control system that combines the power flow control capabilities of the generator-side and grid-side converters, in which transitions between normal operation and fault condition are achieved automatically by monitoring the grid voltage without the need for, or with partial additional ride-through components.

16 Claims, 6 Drawing Sheets

(56) References Cited

U.S. PATENT DOCUMENTS

| | | |
|---|---|---|
| 2006/0232250 A1 | 10/2006 | Sihler et al. |
| 2007/0108771 A1* | 5/2007 | Jones et al. .................. 290/44 |
| 2007/0216343 A1* | 9/2007 | Rozman et al. ............... 318/811 |
| 2008/0180055 A1* | 7/2008 | Zargari et al. ................ 318/729 |
| 2009/0230689 A1* | 9/2009 | Burra et al. ................... 290/55 |
| 2010/0025995 A1* | 2/2010 | Lang et al. .................... 290/44 |
| 2011/0057444 A1 | 3/2011 | Dai et al. |
| 2011/0057588 A1* | 3/2011 | Rineh et al. .................. 318/380 |

\* cited by examiner

GRID FAULT RIDE-THROUGH FOR CURRENT SOURCE CONVERTER-BASED WIND ENERGY CONVERSION SYSTEMS

REFERENCE TO RELATED APPLICATION

This application claims priority to and the benefit of U.S. Provisional Patent Application Ser. No. 61/239,949, filed Sep. 4, 2009, entitled "GRID FAULT RIDE-THROUGH FOR CURRENT SOURCE CONVERTER-BASED WIND ENERGY CONVERSION SYSTEMS", the entirety of which is hereby incorporated by reference.

FIELD OF THE INVENTION

The present invention relates generally to electrical power conversion and more particularly to techniques for enhanced grid fault ride-through capabilities of current source converter (CSC) based wind energy conversion systems (WECS).

BACKGROUND OF THE INVENTION

Wind energy is currently a fast growing power generation technology, and ongoing development is directed to providing wind-generated power to electrical power grids. Power conversion systems are needed to adapt the power generated by the wind turbines to AC electric power in a form compatible with the power grid. One type of conversion apparatus is a current source converter (CSC) that includes a current source rectifier (CSR) and a current source inverter (CSI).

As WECSs become more prevalent, utility operators must ensure the reliability and efficiency of the power system, including compliance with grid connection codes applicable to distributed generators including wind power generators. One such requirement is the capability of WECSs to ride-through grid fault conditions to prevent disconnection of a large wind generator caused by network disturbances to avoid or mitigate system instability and generator trips. Other typical requirements such as reactive and active power regulation based on the system voltage and frequency are also specified. Compliance with these requirements impacts the design of power converters and controllers for WECSs. Currently, the most prevalent WECS configuration is a variable-speed wind turbine used with either a doubly fed induction generator (DFIG) with a partial-rated power converter or an induction/synchronous machine equipped with a fully-rated power converter. DFIG configurations are popular because of the reduced size of the converter (about ⅓ to ¼ of the total KVA rating), but the fault ride-through capability of DFIG systems is limited and additional hardware is required in most cases. Direct-drive permanent magnet synchronous generator (PMSG) solutions with a full power converter are an attractive alternative as these are completely decoupled from the power grid, and provide wide operating range with fault-ride-through capability. In addition, the provision of a permanent magnet rotor (without electrically excited rotor windings) improves system efficiency and eliminates the need for slip-ring and maintenance, making the PMSG solution ideal for high power offshore applications.

Most conventional drive system control schemes assume static grid behavior and are thus not well adapted for accommodating grid fault conditions. A short circuit grid fault and the resultant converter terminal voltage drop may cause the grid side converter to lose its control capability. Unbalanced power flow at the input and output during transients can cause over-current or over-voltage in the converters and trigger the system protection and ultimately converter shut down. Previous fault ride-through techniques have largely been focused on voltage source converters (VSC) in WECS, such as electronic dynamic braking to dump the excessive energy to external resistors or energy storage systems, or allowing the incoming wind energy to be temporarily stored in the moment of inertia of the turbine-generation system. Other proposed fault-condition techniques employ nonlinear control methods to improve the conventional current control performance, but the implementations are complex and very sensitive to system variables. Pulse width modulated (PWM) current source converter (CSC) topologies, compared with VSC based configurations, provide a simple topology solution and excellent grid integration performance such as sinusoidal current and fully controlled power factor, where a DC link reactor provides natural protection against converter short circuit faults. However, unlike VSCs, the grid voltage fault ride through of a CSC-based WECS has been rarely studied in the literature. Accordingly, there is a need for improved wind energy systems by which energy derived from wind-driven machines can be converted in a CSC for supplying electrical power to a grid with the capability of riding through grid fault conditions without introduction of additional hardware.

SUMMARY OF INVENTION

Various aspects of the present invention are now summarized to facilitate a basic understanding of the invention, wherein this summary is not an extensive overview of the invention, and is intended neither to identify certain elements of the invention, nor to delineate the scope thereof. Rather, the primary purpose of this summary is to present some concepts of the invention in a simplified form prior to the more detailed description that is presented hereinafter.

The present disclosure presents power conversion systems and current source converters and switching controls thereof by which CSC-based wind energy and other systems may successfully provide reactive power control and grid fault tolerance while employing current source converter technology and the associated advantages. The disclosed concepts provide novel integrated solutions for control of CSC-based WECSs in normal operation and/or to ride-through grid low voltage faults in which generator-side converter control is used to at least partially regulate the DC link current in an intermediate DC link circuit of the CSC-based converter. In this manner, the ability to regulate the DC link current is extended beyond the capabilities of the grid-side converter, which is particularly useful in certain grid fault ride-through scenarios.

Wind energy conversion systems and current source converters therefor are provided for converting input electrical power from a wind-driven synchronous generator and for providing output electrical power to a power grid in accordance with one or more aspects of the present disclosure. The CSC includes an intermediate circuit with at least one link inductance, as well as a current source rectifier (CSR) with switches operated by CSR switching control signals to selectively couple the input to the intermediate circuit, and a current source inverter (CSI) with switches operated via CSI switching control signals to selectively couple the intermediate circuit to the output. A switch control system is provided, having generator and grid side control components, with the generator side control component providing signals to the CSR to convert input power from the generator to create a DC link current in the intermediate circuit, and the grid side control component providing signals to the CSI to convert the DC link current to output electrical power for the grid.

The switching control system also includes a DC link current control component operative in a first mode to cause the generator side control component to provide the CSR switching control signals to wholly or partially regulate the DC link current. In certain embodiments, unified DC link current control is provided in the first mode with the DC link current control component causing the generator side control component and the grid side control component to jointly regulate the DC link current. In a second mode in some embodiments, grid side control is used exclusively for regulating the link current, with the DC link current control component operating mode being determined according to one or more feedback signals. In certain embodiments, the DC link current control component implements unified link current control in the first mode when the voltage across the link inductance is greater than a maximum DC link voltage control range of the grid side converter (CSI), and otherwise grid side control is used to regulate the link current in the second mode. In this manner, the DC link current can continue to be regulated at a value necessary to support grid voltage recovery in grid fault situations where the grid-side (CSI) control by itself cannot maintain the required DC link current.

In accordance with further aspects of the disclosure, a method is provided for operating a current source converter (CSC) to convert input electrical power to output electrical power in a wind energy conversion system (WECS). The method includes receiving input electrical power in a CSC from a synchronous generator with a rotor coupled directly or indirectly to a wind-driven prime mover and selectively coupling the input to an intermediate circuit using a current source rectifier to convert input power from the generator to create a DC link current in the intermediate circuit. The method also includes selectively coupling the intermediate circuit to the output using a current source inverter to convert the DC link current to provide output electrical power to a power grid, and selectively operating the CSR in a first mode to at least partially regulate the DC link current. Certain embodiments of the method include operating the CSR and the CSI to jointly regulate the DC link current in the first mode. In various embodiments, the method further includes operating the CSI to regulate the link current in a second mode. In certain embodiments, the first mode is entered based at least partially on one or more feedback signals or values from the intermediate circuit, such as when a voltage across the a link inductance is above the maximum DC link voltage control range of the CSI.

BRIEF DESCRIPTION OF THE DRAWINGS

The following description and drawings set forth certain illustrative implementations of the disclosure in detail, which are indicative of several exemplary ways in which the various principles of the disclosure may be carried out. The illustrated examples, however, are not exhaustive of the many possible embodiments of the disclosure. Other objects, advantages and novel features of the invention will be set forth in the following detailed description when considered in conjunction with the drawings, in which.

DETAILED DESCRIPTION OF THE INVENTION

Figure 1:
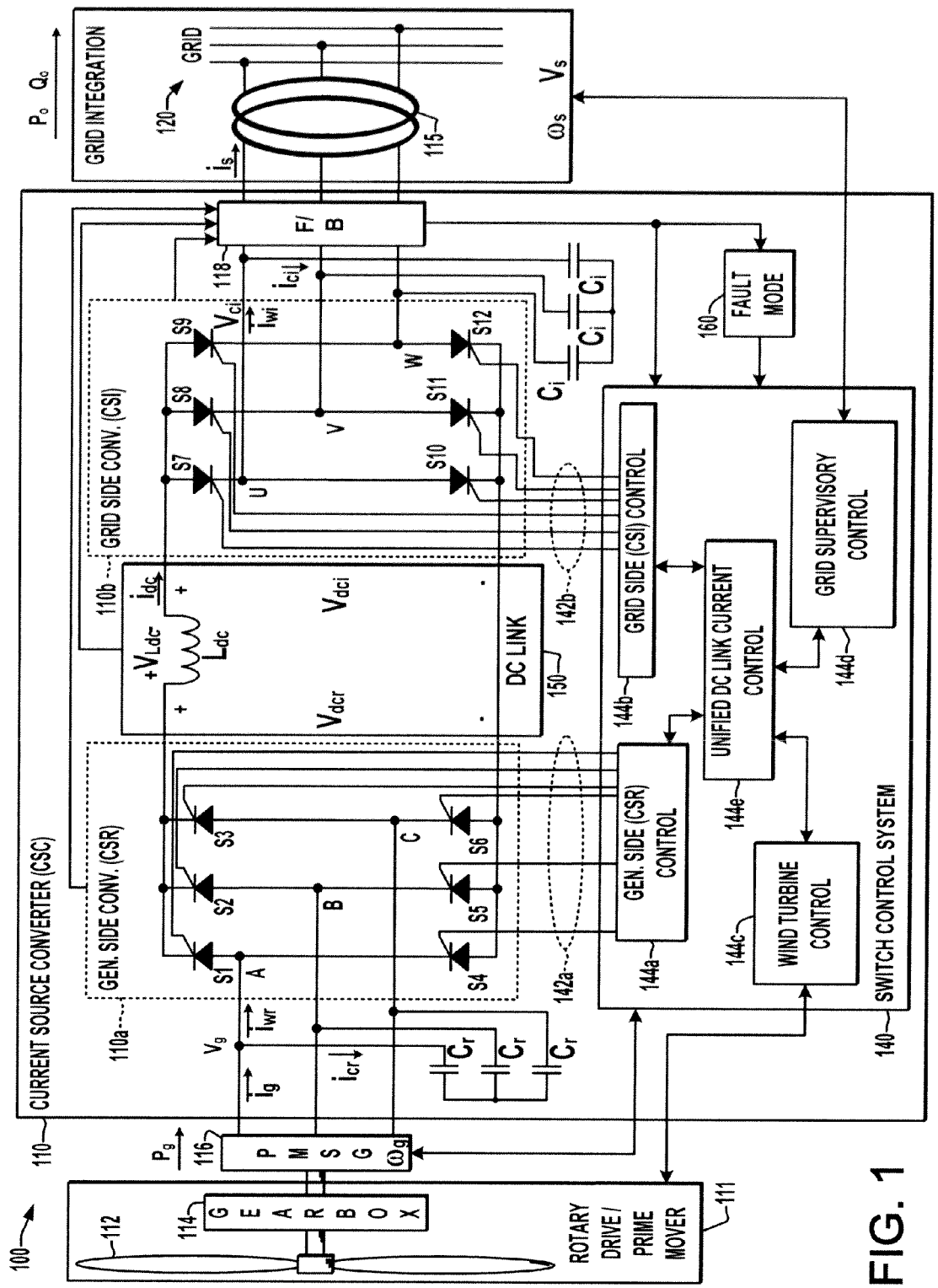
FIG. 1 is a schematic diagram illustrating an exemplary current source converter (CSC) based wind energy power conversion system (WECS) with a synchronous generator and a switch control system with a unified DC link current control component for grid-fault ride-through in accordance with one or more aspects of the present disclosure.

Referring now to the figures, several embodiments or implementations of the present invention are hereinafter described in conjunction with the drawings, wherein like reference numerals are used to refer to like elements throughout, and wherein the various features are not necessarily drawn to scale.

A unified DC link current control scheme is described to facilitate ride through of grid faults in CSC-WECS. Possible implementations assist grid-side active/reactive current regulation to satisfy grid code requirements, and may be fully integrated into the switching control system of the CSC with partial or without additional components for grid fault ride-through capabilities. The coordinated control of the input and output power can also be utilized to smooth power output while maintaining fast control response of the DC link current.

Figure 2:
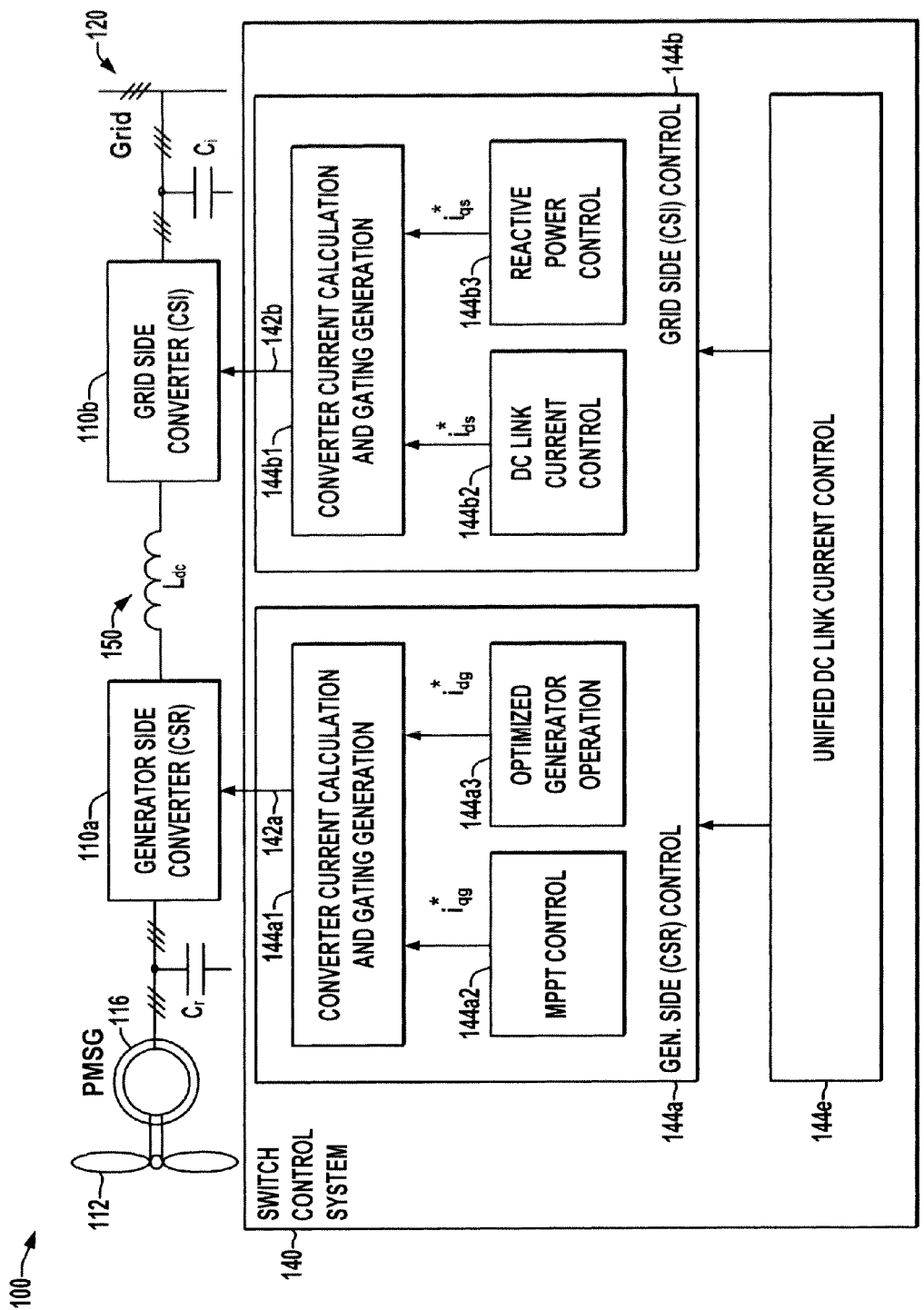
FIGS. 2 and 3 are schematic diagrams illustrating further details of the switch control system in the WECS of FIG. 1.
Figure 3:
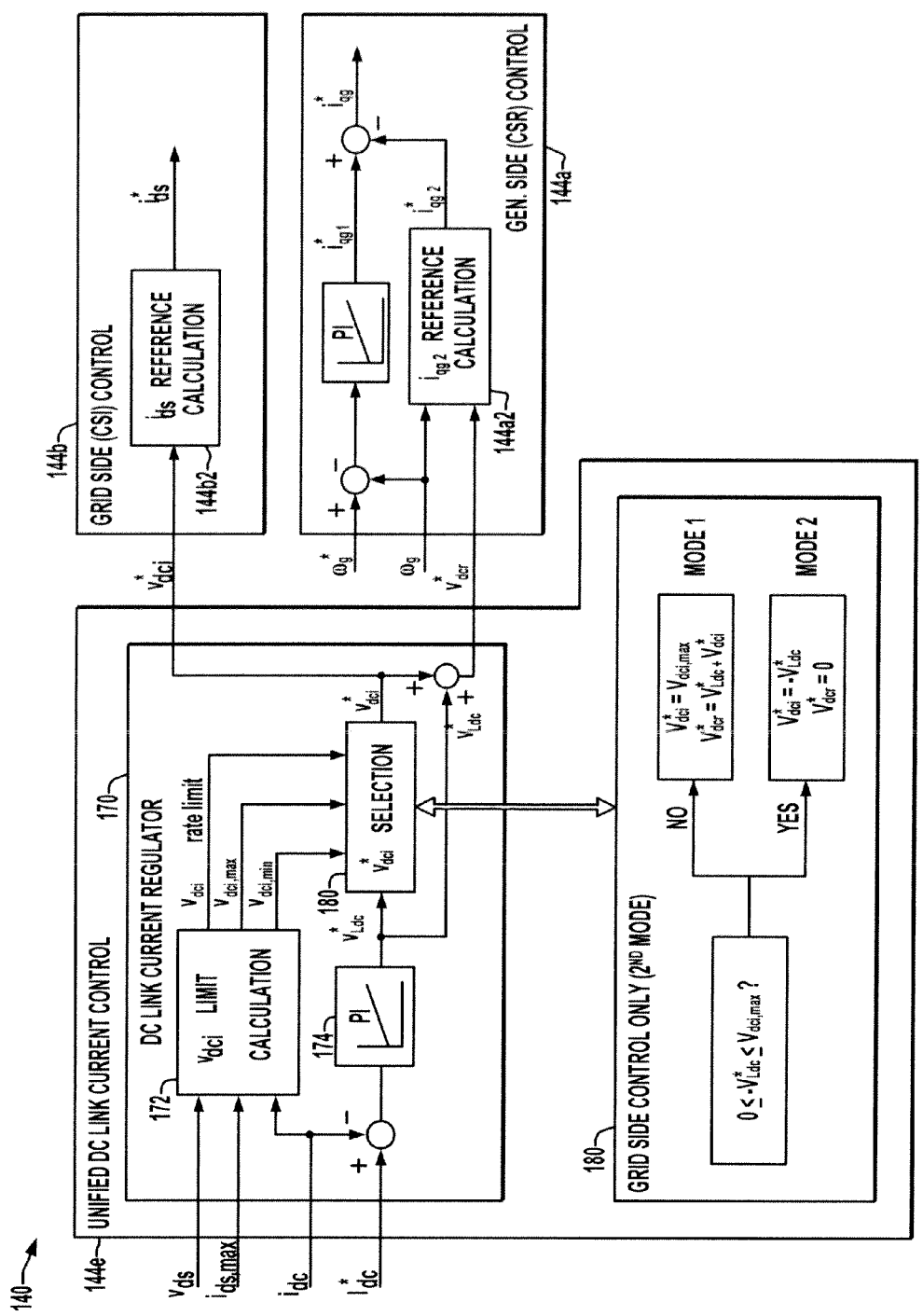

Referring initially to FIGS. 1-3, FIGS. 1 and 2 illustrate an exemplary wind energy converter (WEC) or wind energy system (WES) 100 in accordance with the present disclosure, in which a current source converter (CSC) 110 is connected to an AC power source derived from a wind-receiving rotary propeller 112 operatively coupled with a source of electrical power 116, in one example, a permanent magnet synchronous generator (PMSG) 116 operating in this case as a generator with a permanent magnet rotor. In other embodiments, the power source 116 can be induction machine or other type of generator. The system 100 may optionally include a gearbox 114 operatively coupled between the propeller 112 and the PMSG 116, although not a strict requirement of the present disclosure. The PMSG 116 converts rotational mechanical energy from the propeller 112 into single or multi-phase AC electrical power, which is provided as a machine-side or generator-side power input to the CSC 110, and the CSC 110 provides a grid-side power output in the form of multi-phase AC electrical power to a grid 120.

The CSC 110 converts input (machine-side) power to output (grid-side) power, and includes a generator-side converter or current source rectifier (CSR) 110a that converts the input AC electrical power to DC to feed a DC link intermediate circuit 150 with at least one storage element, such as a DC choke $L_{dc}$ in one example. A grid-side converter or current source inverter (CSI) 110b generates the AC power output to the grid 120 derived from the current $I_{dc}$ in the intermediate circuit 150. As best shown in FIG. 1, certain embodiments may include an optional step-up transformer 115, for example, to step the output voltage (e.g., about 6 KV in one example) up to about 30 KV for the grid 120, and also to provide isolation between the converter 110 and the grid load 120. The CSR 110a and the CSI 110b are switch-based converters including electrical switching devices S1-S6 and S7-S12, respectively, which can be any suitable form of electrical switches, including without limitation IGCTs, GTOs, SGCTs, IGBTs, FETs, etc. The exemplary CSC 110, moreover, includes input line filter capacitors $C_r$ wye-coupled or delta-coupled to the input nodes A, B, and C in the illustrated embodiment. In addition, the exemplary drive 110 may also include output grid capacitors $C_i$ wye-connected or delta-connected to the output lines U, V, and W, although not a requirement of the present disclosure.

Although illustrated in the context of a three-phase electrical conversion system 110, the various power conversion aspects of the present disclosure may be advantageously employed in association with single-phase implementations, as well as multi-phase systems having three or more power lines as input (from a PMSG) and/or output (to a grid). Moreover, the converter 110 may be employed in connection with other forms of input generators 116 and is not limited to permanent magnet synchronous type generators 116. The system 100 and the converter 110 thereof, moreover, may be operated at any suitable input and output frequencies, for example, wherein the frequency of the input power received from the PMSG 116 may vary with the speed of the wind and the converter 110 is adaptable to provide AC electrical power of any desired output frequency to the grid 120. In addition, while illustrated and described in the context of a wind energy system 100, various aspects of the present disclosure can be implemented in association with other forms of CSC-type converters.

In the illustrated three-phase embodiment of FIG. 1, AC input power from the generator 116 is switched by a first set of switches S1-S6 constituting the generator-side converter 110a in the form of a switching current source rectifier (CSR) to create an intermediate DC bus current $I_{ds}$ in the intermediate circuit 150. The grid-side current source inverter (CSI) 110b includes a second set of switches S7-S12 forming a switching inverter stage that selectively switches the DC power from the intermediate circuit 150 to provide multiphase AC output power to the grid 120. The intermediate circuit 150 includes a DC choke or inductor $L_{dc}$ linking the switches of the CSR 110a and the CSI 110b and provides forward and reverse current paths between the converters 110a and 110b. The inductor $L_{dc}$ of the exemplary intermediate circuit 150 includes a first winding WA in a forward or positive DC path between the upper CSR switches S1-S3 and the upper CSI switches S7-S9. Other possible implementations may include further windings, such as a second winding (not shown) in a negative or return DC path between the lower CSR switches S4-S6 and the lower CSI switches S10-S12. The switching devices S1-S6 and S7-S12 may be any suitable controllable electrical switch types (e.g., IGCTs, SGCTs, GTOs, thyristors, IGBTs, etc.) that are controlled according to any suitable type or form of switching scheme or schemes, such as phase control, pulse width modulation, etc., in open or closed-loop fashion.

The converters 110a and 110b operate under control of a switch control system 140 for conversion of input wind power to grid power, although separate switching control systems may be employed, for example, with interconnections and information sharing to facilitate the coordinated operation of the CSR 110a and the CSI 110b. The illustrated CSC 110 also includes a fault mode control 160 for modifying the operation of the converter 110 during fault conditions on the grid 120. CSR switching control signals 142a are provided to the individual switches S1-S6 and CSI signals 142b are provided to the CSI switches S7-S12 from the switch control system 140 in order to implement a given power conversion task. The switch control system 140 may be provided with one or more setpoint desired values and one or more feedback signals or values from a feedback system 118 by which one or more closed loop power conversion goals are achieved in normal operation, and by which the CSC 110 can facilitate operation during grid faults when the grid voltage(s) drops below a predetermined threshold value. In the illustrated embodiments, for example, the switch control system 140 provides inputs for receiving a fault mode signal 160, feedback signals or values from the output feedback system 118, measured input values (e.g., line voltages, currents, etc.), and other information, data, etc., which may be in any suitable form such as an electrical signal, digital data, etc., and which may be received from any suitable source, such as an external network, switches, a user interface associated with the system 100, or other suitable source(s). The switch control system 140 and the components thereof may be any suitable hardware, processor-executed software, processor-executed firmware, logic, or combinations thereof that are adapted to implement the functions illustrated and described herein.

In normal operation, the switching devices S1-S6 of the CSR 110a selectively coupled individual ones of the input terminals A, B, and/or C with the intermediate circuit 150 according to a plurality of CSR switching control signals 142a so as to convert input multiphase electric power to DC current $I_{ds}$ in the intermediate circuit 150, and the CSI switches S7-S12 are operated according to the CSI switching control signals 142b to selectively couple the intermediate circuit 150 to the output so as to provide multiphase output power to the grid 120. The feedback system 118 provides one or more feedback values or signals to the control system 140 that are indicative of one or more electrical conditions at the output, or of the converters 110 or in the intermediate circuit 150, such as the voltage across the link inductance $L_{dc}$.

As shown in FIGS. 1 and 2, the switching control system 140 includes a generator-side (CSR) control component 144a providing the switching control signals 142a to the CSR 110a, a grid-side (CSI) control component 144b providing the CSI switching control signals 142b to the CSI 110b. The exemplary system 140, moreover, includes a wind turbine control component 144c and a grid supervisory control component 144d, as well as a unified DC link current control component 144e, which may internally switch between first and second operational modes based on one or more signals/values from the feedback system 118 and/or which may modify its link current regulation technique based in whole or in part on a fault mode signal 160.

The DC link current control component 144e in one embodiment operates in first and second modes, including a first mode where link controller 144e causes the generator side control component 144a to provide the CSR switching control signals 142a to at least partially regulate the DC link current $I_{dc}$. In certain embodiments, the component 144e implements unified DC link current control in the first mode with the generator side control component 144a and the grid side control component 144b jointly regulating the DC link current $I_{dc}$. The DC link current control component 144e operates in a second mode to cause the grid side control component 144b to regulate $I_{dc}$ via the CSI switch control signals 142b. In the CSC 110, the operational mode of the DC link current control component 144e is set based on one or more signals from the feedback system 118 to advantageously allow adaptation of the link current regulation for changing conditions, such as grid faults.

In certain embodiments, the DC link current control component 144e implements unified link current control in the first mode when the magnitude of the voltage $-V_{Ldc}$ across the link inductance $L_{dc}$ is greater than the maximum DC link voltage control range $V_{dci,max}$ of the grid side converter (CSI), and otherwise ($-V_{Ldc} \leq V_{dci,max}$) in the second mode the grid side control 144b is used exclusively to regulate the link current $I_{dc}$. For example, the unified DC link current control aspects of the switch control system 140 advantageously continues to regulate $I_{dc}$ at a value necessary to support grid voltage recovery in grid fault situations where the grid-side (CSI) control 144b by itself cannot maintain the required DC link current level $I_{dc}$. In particular, the unified control 144e allows the CSC 110 to provide reactive current to support grid voltage recovery during grid voltage dips and short circuit faults. The control component 144e accommodates the changed DC link current reference value $I^*_{dc}$ in such situations, and selectively enters the first mode to supplement the grid-side link current regulation with regulation by the generator-side controller 144a to meet the active and reactive current references required by the needs of the grid 120.

Figure 7:
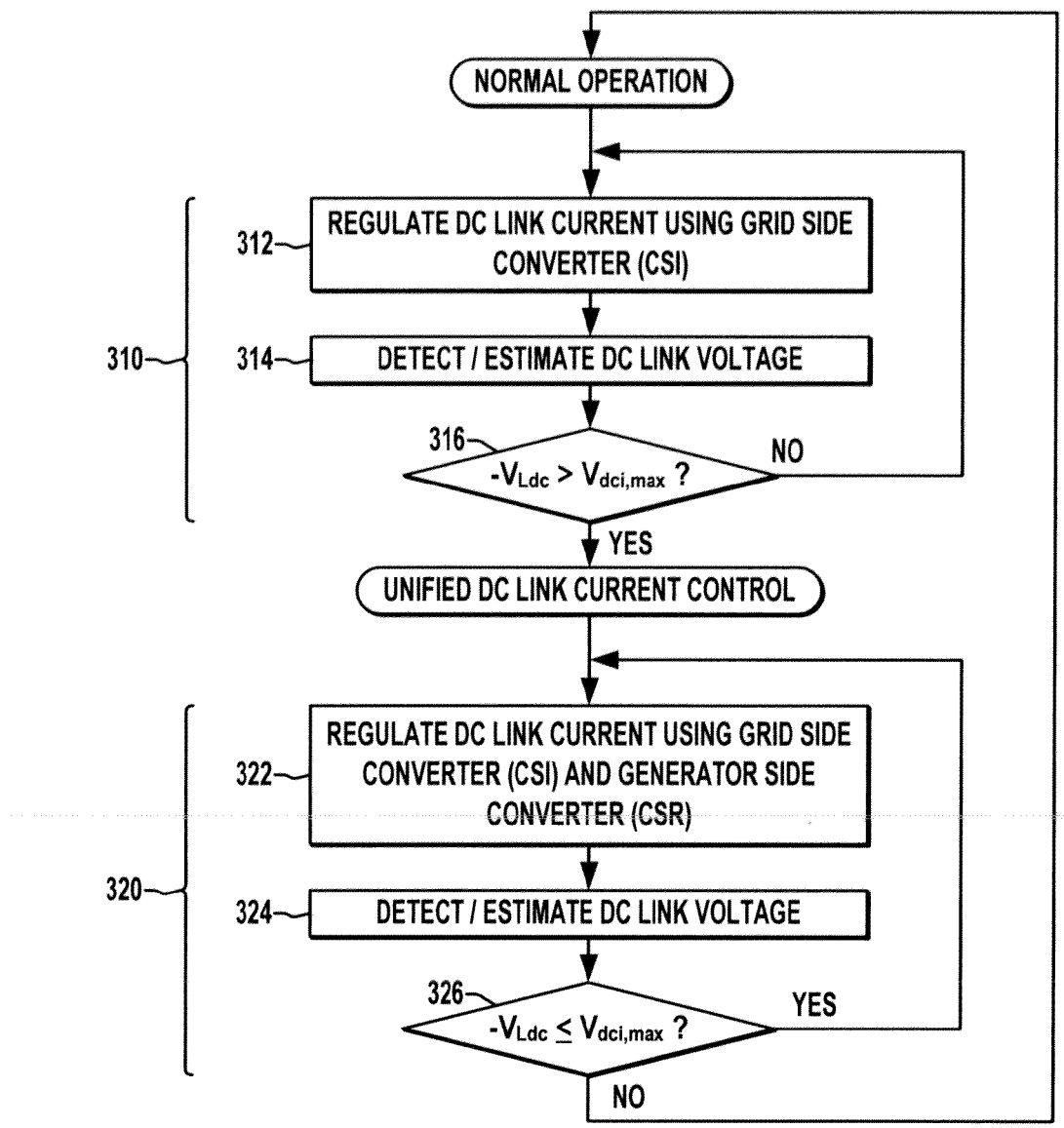
FIG. 7 is a flow diagram illustrating an exemplary method for controlling a CSC-based WECS in accordance with further aspects of the disclosure.

Referring also to FIG. 7, the operation of the CSC 110 is further detailed in an exemplary method 300 for operating a current source converter CSC 110 to convert input electrical power to output electrical power in a wind energy conversion system such as the WECS 100 described herein. Although the exemplary method 300 is depicted and described in the form of a series of acts or events, it will be appreciated that the various methods of the disclosure are not limited by the illustrated ordering of such acts or events except as specifically set forth herein. In this regard, except as specifically provided hereinafter, some acts or events may occur in different order and/or concurrently with other acts or events apart from those illustrated and described herein, and not all illustrated steps may be required to implement a process or method in accordance with the present disclosure. The illustrated methods may be implemented in hardware, processor-executed software, or combinations thereof, in order to provide CSC-based energy conversion control functionality including regulation of intermediate DC link current in WECS control systems such as those illustrated and described herein, although the invention is not limited to the specifically illustrated or described applications and systems. For instance, the method 300 and the CSC concepts described herein can also be combined with one or more partial energy storage components, including without limitation braking resistors, capacitors, and/or batteries.

In normal operation at 310 in FIG. 7, the method 300 provides for conversion of wind energy to grid power through receipt of input electrical power from a synchronous generator (e.g., generator 116 above) rotated by a wind-driven prime mover (111) at an input of a current source converter (CSC 110), and selective coupling of the input to an intermediate circuit (150) using a current source rectifier (e.g., CSR 110a) to convert input power from the generator to create a DC link current ($I_{dc}$) in the intermediate circuit. The normal operation 310 also includes selectively coupling the intermediate circuit to the output using a current source inverter (e.g., CSI 110b of the CSC 110) to convert the DC link current ($I_{dc}$) to provide output electrical power to a power grid (120), with the DC link current being regulated at 312 using the grid side converter (CSI 110b) through provision of the control signals 142b by the controller 144b. The DC link voltage (e.g., $V_{Ldc}$ in FIG. 1 above) or other feedback signal/value associated with the intermediate circuit is detected or estimated at 314. A determination is made at 316 as to whether the link voltage exceeds the control range of the grid side converter (e.g., whether $-V_{Ldc} > V_{dci,max}$). If not (NO at 316), the control remains in the normal operating mode at 310 with the grid side controller 144b solely responsible for regulation of the DC link current ($I_{dc}$).

If, however, the grid side control can no longer accommodate the required link current value (YES at 316 where $-V_{Ldc} \leq V_{dci,max}$, such as during grid fault ride through situations), the switching control system (140) enters a unified control mode (first mode described above) in which unified control is implemented (via the unified DC link controller 144e in FIGS. 1-3 above) with the generator side converter (CSR 110a) at least partially regulating the DC link current $I_{dc}$. In one implementation, the DC link current $I_{dc}$ is jointly regulated at 322 in FIG. 7 by both the grid side converter (CSI 110b) and the generator side converter (CSR 110a) in the first mode at 320. The DC link voltage ($V_{Ldc}$ in one example) is again detected or estimated at 324 and a determination is made at 326 as to whether this has fallen to or below the control range of the grid side converter (e.g., whether $-V_{Ldc} \leq V_{dci,max}$). If so (YES at 326), the control remains in the unified regulation mode at 320 as described above, and if not (NO at 326), the control system 140 returns to normal mode at 310 with the grid side controller 144b exclusively regulating the DC link current ($I_{dc}$).

As shown in FIG. 1, the switching control system 140 for the whole WECS 100 includes the wind turbine controller 144c, the controllers 144a and 144b for generator-side/grid-side converters, and the grid integration supervisory system 144d. The turbine controller 144c in certain embodiments measures wind speed and provides references for turbine pitch control, if available, as well as a generator speed controller to achieve maximum power point tracking and proper turbine protection. The grid integration supervisory controller 144d in certain embodiments monitors the grid voltage $V_s$ and frequency $\omega_s$ to detect possible grid operating conditions, such as loss of load or any grid faults. Based on the detected information and the grid code requirements, it will issue corresponding commands to the converter control components of the system 140.

FIGS. 2 and 3 further illustrate the controllers 144a, 144b, and 144e in the exemplary switch control system 140, in which field oriented control (FOC) is developed at the generator side controller 144a and voltage oriented control (VOC) is employed for the grid side control 144b in one embodiment, in which 'd' and 'q' subscriptions denote the d-axis and q-axis of the selected synchronous frame, respectively. As shown in FIG. 3, the generator-side controller 144a provides a MPPT control component 144a2 setting the generator q-axis current $i^*_{qg}$ and an optimized generator operation component 144a3 that sets the grid d-axis current $*i_{dg}$, and these values are used by a converter current calculation and gating generation component 144a1 to generate the switching control signals 142a. In addition, the grid-side controller 144b includes a DC link current control component 144b2 setting the d-axis current $i^*_{ds}$ and a reactive power controller 144b3 that sets the current $i^*_{qs}$, and these values are used by a converter current calculation and gating generation component 144b1 to generate the switching control signals 142b, where $i^*_{qg}$ and $*i_{ds}$ are generally related to the real power control of the system 100. The converter gating generation can be, for example, space vector modulation (SVM) or any modulation scheme that can control the amplitude and delay angle of the reference vector.

The power flow can be maintained by controlling the generator speed $\omega_g$ to trace the reference speed from wind turbine controller 144c, while regulating the DC link current level $I_{dc}$ by the grid-side converter 110b to ensure the balanced power flow at both sides. The reactive power control at the generator side 144a helps obtain desired generator terminal voltage $V_g$ and current $i_g$, minimizing generator line current or limiting generator terminal voltage. At the grid side converter 110b, reactive power control is used to regulate the grid voltage $V_{dci}$ or to meet other grid operating requirements ($V_{dci}$ can be regulated by grid-side reactive power control). In order to achieve all these control objectives, both converters 144a and 144c in certain embodiments use space vector modulation (SVM) or other suitable modulation scheme to generate the switching control signals 142.

Figure 4:
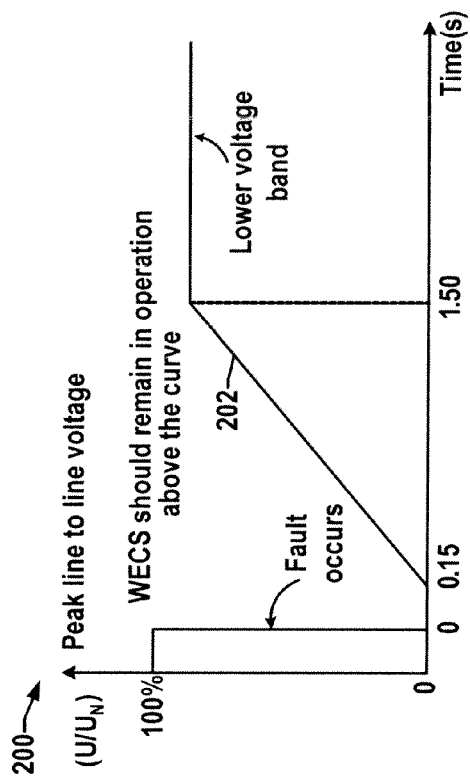
FIG. 4 is a graph showing preferred low grid voltage ride through operation of the WECS of FIGS. 1-3.
Figure 5:
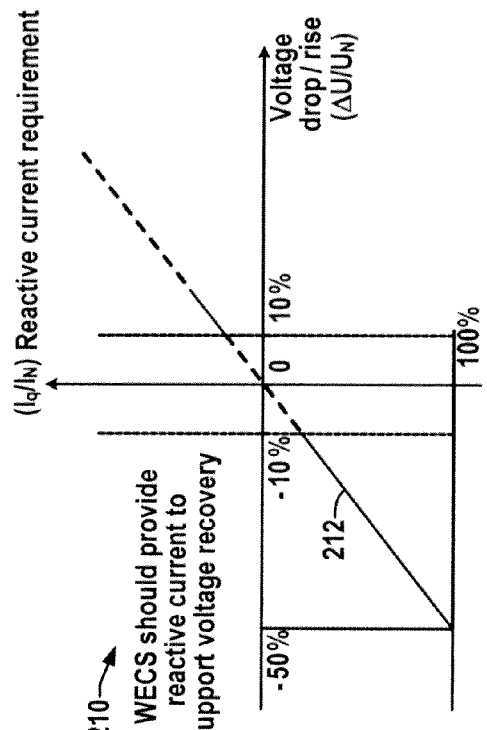
FIG. 5 is a graph showing preferred reactive current control performance of the WECS of FIGS. 1-3 to support voltage recovery.

Referring also to FIGS. 4 and 5, absent the disclosed grid fault control techniques, grid faults may interrupt system power flow and result in DC link current overshoot that could trigger the system protection. A graph 200 in FIG. 4 illustrates preferred low grid voltage ride through operation of the CSC-WECS 100, in which it desired that the WECS 100 peak line-line voltage performance operation remain above the curve 202 during and following a grid fault condition. FIG. 5 provides a graph 210 with a curve 212 showing desired WECS reactive current control performance as a function of grid voltage drop in order to support grid voltage recovery without damage to the converters 110a, 110b of the CSC-WECS 100. In the CSC 110, the instantaneous current flowing through the switching devices S1-S12 of the converters 110a and 110b is equal to the DC link current $I_{dc}$, and so long as $I_{dc}$ is properly regulated, the converter overcurrent protection apparatus will not be invoked. Moreover, during grid fault recovery (ride-through) operation, it is desired that the CSC 110 provide proper active/reactive current to the grid 120, and thus the DC link $I_{dc}$ must be maintained above a minimum required level. The advanced (unified) DC link current regulation techniques described herein facilitate both these goals, even where grid fault conditions would otherwise extend beyond the DC link current regulation control limitations of the grid-side controller 144b, since the disclosed operation selectively employs supplemental regulation of the link current $I_{dc}$ using the generator-side (CSR) controller 144a.

The low voltage ride-through requirement of FIG. 4 shows a grid-short condition where the grid voltage drops to zero for a time and approximately 150 ms later begins to recover along curve 202, so the WECS 100 is designed to operate above the curve 202. In the curve 210 of FIG. 5, the WECS 100 is inputting power to the grid 120 during fault ride-through when the voltage drops by more than 10% of nominal, in which case the CSC-WECS 100 preferably provides some reactive current $i_{qs}$ to support the grid voltage $V_s$, and thus to helping grid voltage recovery from a low voltage fault. In power systems, for example, the grid operators are actually trying to help adjust the grid frequency $\omega_s$ and this reactive current $i_{qs}$ provided by the WECS 100 is particularly helpful in grid voltage recovery because of inductive characteristics of the grid 120 itself. That active current helps adjust the rate of frequency $\omega_s$ which is the electrical frequency of the grid voltage $V_s$.

The inventors have appreciated that the DC link current $i_{dc}$ in a CSC 110 can be controlled by either the grid side CSI converter 110b and/or by the generator-side CSR converter 110a. In certain embodiments, for normal operation with a stiff grid 120 (e.g., normal mode 310 in FIG. 7), the DC link current $i_{dc}$ is conventionally controlled by the grid-side converter 110b to achieve better performance. In the exemplary CSC-WECS 100, when a grid short circuit fault happens, the voltage dip makes it difficult to transfer energy to the grid 120, but during such conditions the input power from the wind turbine-generator 116 continues to charge the DC link choke $L_{dc}$ if the generator-side CSR converter 110a remains controlled according to speed or torque regulation. In the illustrated examples, the central regulator 144e switches to a fault mode (MODE 1 in FIG. 3) to distribute the DC link current control task to both the grid-side and generator-side controllers 144b and 144a which, in turn, will manage the active power flow and maintain proper DC link current $i_{dc}$ in coordinated fashion.

In this unified DC link current regulation mode, the DC link current $i_{dc}$ is determined by the DC voltage difference of the grid-side and generator-side converters ($V_{dcr}$ and $V_{dci}$ in FIG. 1), which is stated as $v_{Ldc}=L_{dc}di_{dc}/dt=v_{dcr}-v_{dci}$. This relationship correlates the control of the two converters 110a and 110b in one embodiment by dividing the DC current regulator output $V^*_{Ldc}$ into a grid-side average DC voltage reference $v^*_{dci}$ and a generator-side average DC voltage reference $v^*_{dcr}$. The distribution of $v^*_{Ldc}$ upon these two parts in certain embodiments is done according to grid voltage level, converter ratings and operating conditions. To avoid motoring operation mode, the lower limit of the grid side reference, $v^*_{dci,min}$, is set to zero in this embodiment, although other implementations are possible. Assuming the loss in the grid-side converter 110b is neglected, the upper limit can be derived based on the power calculation $V_{dci,max}=P_{o,max}/i_{dc}=1.5v_{ds,max}/i_{dc}$, where $i_{ds,max}$ and $P_{o,max}$ are the maximum allowable active current and power on the grid side.

The grid-side converter 110b provides the master control for the DC link current $i_{dc}$ in this exemplary unified control embodiment. If the DC link current $i_{dc}$ is within the grid-side converter control capability (e.g., $0 \leq -v^*_{Ldc} \leq v_{dci,max}$), the system works in normal mode with $v^*_{dcr}=0$ and $v^*_{dci}=-v^*_{Ldc}$ in which the generator-side converter 110a does not regulate the DC link current $i_{dc}$. When the grid voltage magnitude $v_{ds}$ drops and the resultant $V_{dci,max}$ decreases to a level below $-v^*_{Ldc}$ ($-v^*_{Ldc}>v_{dci,max}$), the excessive portion of $v^*_{Ldc}$ will be transferred to the generator-side (CSR) converter 110a to reduce the input power from the generator 116. The average DC voltage references are now $v^*_{dci}=v_{dci,max}$ and $v^*_{dcr}+v^*_{dci}$.

The selection of $v_{dci}^*$ and $V_{dcr}$ values is summarized in FIG. 3. As illustrated, the unified DC link current controller 144e includes a DC link current regulator 170 with a $V_{dci}$ limit calculation component 172, a proportional-integral (PI) controller 174, and a selection component 180 that sets the operational mode with respect to regulation of the DC link current $i_{dc}$ and provides the $v^*_{dci}$ and $v^*_{dcr}$ values to the controllers 144b and 144a, respectively. In the corresponding controllers 144b and 144a, $v^*_{dci}$ and $v^*_{dcr}$ are translated to the active current references $i^*_{ds}$ and $i^*_{qgs2}$ via reference calculation components 144b2 and 144a2 of the grid-side and generator-side converters 144b and 144a, respectively. In this manner, neglecting losses in the converters and the DC link 150, the reference currents used for control of the CSC 110 are $i^*_{ds}=P^*_o/(1.5v_{ds})$, and $i^*_{qg2}=P^*_g/(1.5\psi_f\omega_g)=v^*_{dcr}i_{dc}/(1.5\psi_f\omega_g)$, where the torque current reference $i^*_{qg}$ of the generator-side controller 144a is the difference between the speed regulator output $i^*_{qg1}$ and the calculated torque current reference $i^*_{qg2}$. During grid fault periods, the speed feedback is set to be the same as the reference, and hence the generator speed regulator output remains the same as the pre-fault value.

The generator speed $\omega_g$ will gradually increase because of the reduced electrical torque because of the amount of $i^*_{qg2}$ introduced from the unified controller 144e, and the extra energy is stored as kinetic energy in the moment of inertia of the turbine-generator mechanical system 111. This is a reasonable situation, since the fault duration is normally very short and if the fault lasts significantly longer, the system will be shutdown. Moreover, a typical moment of inertia of a MW wind turbine is around 4 to 6s, and considering the fault ride-through requirements in E.ON grid code, the increase of the generator speed during this period would be only around 2 to 3% even under operation with rated wind turbine mechanical torque before the fault happens. After the fault is cleared and the grid voltage recovers, and $v_{dci,max}$ rises.

The distribution of DC link regulator output on $v^*_{dci}$ and $v^*_{dcr}$ changes along with the variation of $v_{dci,max}$ and the output power requirements. In response to the variation, the grid-side controller 144b regains the control capability and resumes to output active power with exclusive regulation of the DC link current $i_{dc}$. A rising rate limit is employed in certain embodiments to avoid excessively rapid increases in $v^*_{dci}$ and helps smooth the output power. As the amount of $v^*_{dcr}$ is gradually retracted, the generator speed regulator of the controller 144c again picks up the real speed feedback $\omega_g$ and become the dominant factor to determine the torque current, and the speed regulation starts to trace the reference properly. All the transitions from normal operation to fault condition or reverse are managed automatically by the unified DC link current controller 144e in certain embodiments.

Figure 6:
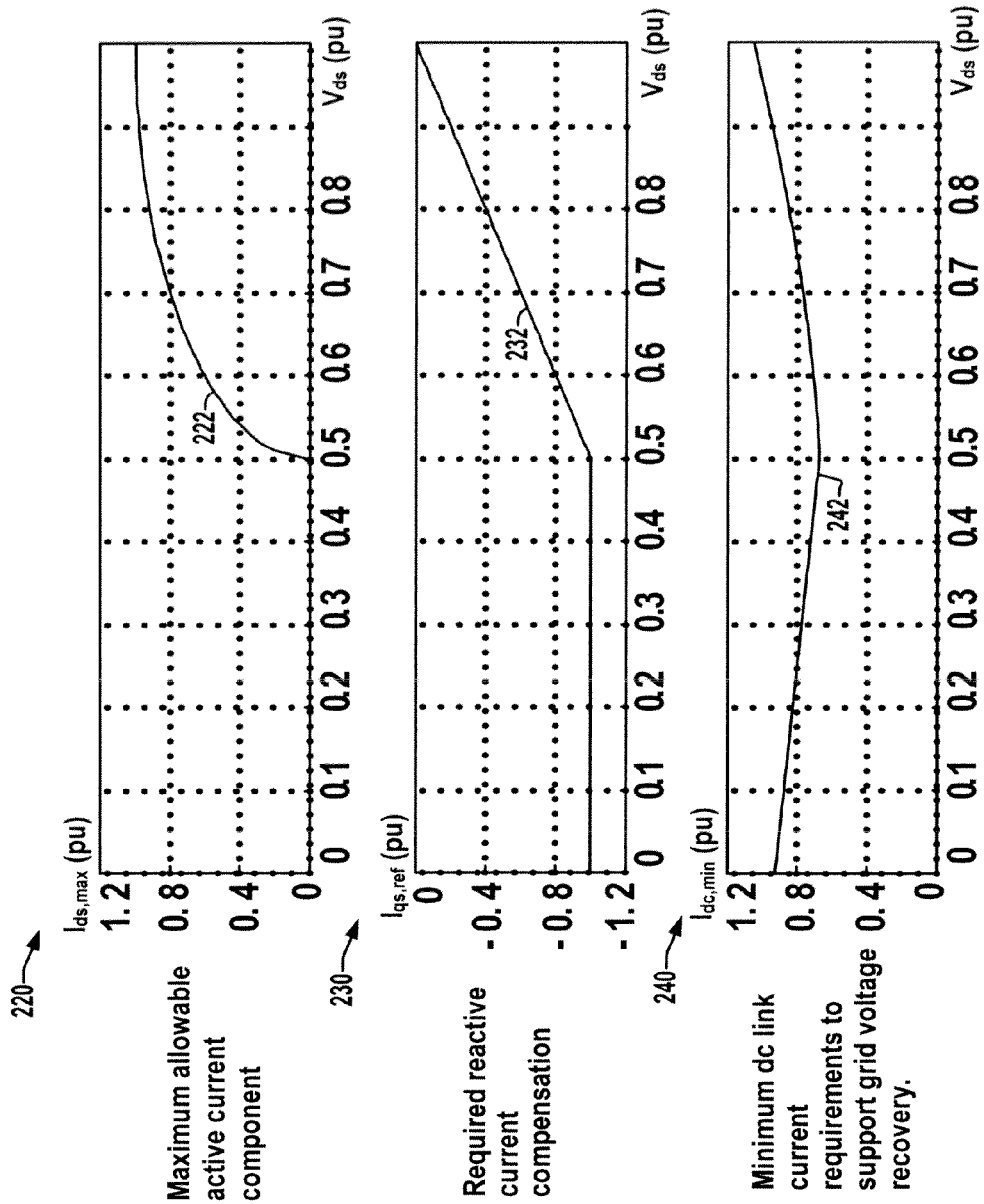
FIG. 6 illustrates graphs of maximum allowable active current, required reactive current compensation, and minimum DC link current to support grid voltage recovery in the WECS of FIGS. 1-3.

Referring also to FIG. 6, graph 220 shows maximum allowable active current $I_{ds,max}$ 222 in the WECS 100, graph 230 illustrates required reactive current compensation $I_{qs,ref}$ 232, and graph 240 shows minimum DC link current $I_{dc,min}$ 242 to support grid voltage recovery in (pu) as a function of the grid voltage $V_{ds}$ in the WECS 100. With respect to reactive current compensation to support the grid voltage during grid voltage dips and short circuit faults, the unified control 144e provides adjustment of the DC link current reference according to the grid side active/reactive current references. In practice, different system operators may require different reactive power compensation ratios. The EON code, for example, requires the generation system to provide 2% of reactive power compensation for each 1% of voltage dip up to a maximum of 100% of reactive current. In this case, the reactive current will vary as shown in FIG. 6 as the grid voltage dip level increases. In the meantime, the active power is determined by the available wind power, the converter rating, and also the maximum allowable current at the grid connection. Assuming the maximum steady state operating current at the grid terminal is 1 pu, the active power output could be derived as:

$$i_{qs} = \begin{cases} mI_b(V_{b-v_s})/V_b & (0.5V_b < v_s \leq V_b) \\ I_b & (0 \leq V_s \leq 0.5V_b) \end{cases} \text{ and } i_{ds.max} = \sqrt{I_b^2 - I_{qs}^2},$$

where the base values $I_b$ and $v_b$ are the magnitudes of the rated phase current and voltage, respectively, and the DC link current reference can be derived as:

$$i^*_{dwi} = (1-w_s^2 L_o C_i)i_{dwi} - w_s R_o C_1 i_{qs}$$

$$i^*_{qwi} = w_s C_i(V_{ds} + R_o i_{ds}) + (1-w_3^2 L_o C_i)i_{qs}$$

$$I^*_{dc} = \sqrt{i^{*2}_{dwi} + i^{*2}_{qwi}}/m_{ai}.$$

The minimum operational DC link current can be obtained by setting the modulation index of the grid-side converter, $m_{ai}$ to unity. In order to provide the required reactive current, the reference current for the unified DC link current controller 144e should be kept above the curve 242 in the graph 240 of FIG. 6.

In accordance with further aspects of the present disclosure, a non-transitory, tangible computer readable medium is provided, such as a computer memory, a memory within a power converter control system (e.g., switch control system 140 in FIG. 1 above), a CD-ROM, floppy disk, flash drive, database, server, computer, etc.) which has computer executable instructions for performing the above described methods. The above examples are merely illustrative of several possible embodiments of various aspects of the present invention, wherein equivalent alterations and/or modifications will occur to others skilled in the art upon reading and understanding this specification and the annexed drawings. In particular regard to the various functions performed by the above described components (assemblies, devices, systems, circuits, and the like), the terms (including a reference to a "means") used to describe such components are intended to correspond, unless otherwise indicated, to any component, such as hardware, processor-executed software, or combinations thereof, which performs the specified function of the described component (i.e., that is functionally equivalent), even though not structurally equivalent to the disclosed structure which performs the function in the illustrated implementations of the invention. In addition, although a particular feature of the invention may have been disclosed with respect to only one of several implementations, such feature may be combined with one or more other features of the other implementations as may be desired and advantageous for any given or particular application. Also, to the extent that the terms "including", "includes", "having", "has", "with", or variants thereof are used in the detailed description and/or in the claims, such terms are intended to be inclusive in a manner similar to the term "comprising".

Having thus described the invention, the following is claimed:

1. A current source converter (CSC) for converting input electrical power to output electrical power, comprising:
   an input for receiving input electrical power from a power source;
   an output for providing output electrical power to a power grid;
   an intermediate circuit with at least one inductance;
   a current source rectifier (CSR) comprising a plurality of switching devices coupled with the input and with the intermediate circuit and operative according to a plurality of CSR switching control signals to selectively couple the input to the intermediate circuit;
   a current source inverter (CSI) comprising a plurality of switching devices coupled with the intermediate circuit and with the output and operative according to a plurality of CSI switching control signals to selectively couple the intermediate circuit to the output; and
   a switch control system comprising:
      a generator side control component operatively coupled with the CSR to provide CSR switching control signals to the CSR to cause the CSR to convert input power from the power source to create a DC link current in the intermediate circuit,
      a grid side control component operatively coupled with the CSI to provide CSI switching control signals to the CSI to convert the DC link current to selectively provide the output electrical power to the power grid, and
      a DC link current control component operatively coupled with the generator side control component and with the grid side control component, and is operative in a first mode to cause the generator side control component to provide the CSR switching control signals based at least partially on a voltage across the at least one inductance and to cause the grid side control component to provide the CSI switching control signals based at least partially on the voltage across the at least one inductance such that the generator side control component and the grid side control component jointly and concurrently regulate the DC link current; and wherein the DC link current control component is operative in a second mode to cause the grid side control component to provide the CSI switching control signals to exclusively regulate the DC link current.

2. The CSC of claim 1, further comprising a feedback system operatively coupled with the intermediate circuit and providing at least one feedback value or signal to the switch control system indicative of a voltage across the at least one inductance, wherein the DC link current control component is operative to selectively enter one of the first and second modes based at least in part on the at least one feedback value or signal.

3. The CSC of claim 2, wherein the DC link current control component is operative to selectively enter the first mode when the voltage across the at least one inductance is greater than a maximum DC link voltage control range of the grid side control component, and to enter the second mode when the voltage across the at least one inductance is less than or equal to the maximum DC link voltage control range of the grid side control component.

4. The CSC of claim 1, wherein the DC link current control component is operative in a second mode to cause the grid side control component to exclusively regulate the DC link current.

5. The CSC of claim 4, further comprising a feedback system operatively coupled with the intermediate circuit and providing at least one feedback value or signal to the switch control system indicative of a voltage in the intermediate circuit, wherein the DC link current control component is operative to selectively enter one of the first and second modes based at least in part on the at least one feedback value or signal.

6. The CSC of claim 5, wherein the DC link current control component is operative to selectively enter the first mode when a voltage across the at least one inductance is greater than a maximum DC link voltage control range of the grid side control component, and to enter the second mode when the voltage across the at least one inductance is less than or equal to the maximum DC link voltage control range of the grid side control component.

7. A current source converter (CSC) for converting input electrical power to output electrical power, comprising:
   an input for receiving input electrical power from a power source;
   an output for providing output electrical power to a power grid;
   an intermediate circuit with at least one inductance;
   a current source rectifier (CSR) comprising a plurality of switching devices coupled with the input and with the intermediate circuit and operative according to a plurality of CSR switching control signals to selectively couple the input to the intermediate circuit;
   a current source inverter (CSI) comprising a plurality of switching devices coupled with the intermediate circuit and with the output and operative according to a plurality of CSI switching control signals to selectively couple the intermediate circuit to the output; and
   a switch control system comprising:
      a generator side control component operatively coupled with the CSR to provide CSR switching control signals to the CSR to cause the CSR to convert input power from the power source to create a DC link current in the intermediate circuit,
      a grid side control component operatively coupled with the CSI to provide CSI switching control signals to the CSI to convert the DC link current to selectively provide the output electrical power to the power grid, and
      a DC link current control component operatively coupled with the generator side control component and with the grid side control component, and is operative in a first mode to cause the generator side control component and the grid side control component to provide the CSR and CSI switching control signals to jointly and concurrently regulate the DC link current;
   wherein the DC link current control component is operative in a second mode to cause the grid side control component to exclusively regulate the DC link current.

8. The CSC of claim 7, further comprising a feedback system operatively coupled with the intermediate circuit and providing at least one feedback value or signal to the switch control system indicative of a voltage across the at least one inductance, wherein the DC link current control component is operative to selectively enter the first mode based at least in part on the at least one feedback value or signal.

9. The CSC of claim 8, wherein the DC link current control component is operative to selectively enter the first mode when the voltage across the at least one inductance is greater than a maximum DC link voltage control range of the grid side control component.

10. A wind energy conversion system (WECS) for providing electrical power to a grid, comprising:
   a generator with a rotor adapted to be driven by a prime mover and a generator output providing multiphase electrical output power when the rotor is driven; and
   a current source converter (CSC) for converting input electrical power to output electrical power, comprising:
      an input for receiving input electrical power from the generator;
      an output for providing output electrical power to a power grid;
      an intermediate circuit with at least one inductance;
      a current source rectifier (CSR) comprising a plurality of switching devices coupled with the input and with the intermediate circuit and operative according to a plurality of CSR switching control signals to selectively couple the input to the intermediate circuit;
      a current source inverter (CSI) comprising a plurality of switching devices coupled with the intermediate circuit and with the output and operative according to a plurality of CSI switching control signals to selectively couple the intermediate circuit to the output; and
   a switch control system comprising:
      a generator side control component operatively coupled with the CSR to provide CSR switching control signals to the CSR to cause the CSR to convert input power from the generator to create a DC link current in the intermediate circuit,
      a grid side control component operatively coupled with the CSI to provide CSI switching control signals to the CSI to convert the DC link current to selectively provide the output electrical power to the power grid, and
      a DC link current control component operatively coupled with the generator side control component and with the grid side control component, and is operative in a first mode to cause the generator side control component and the grid side control component to provide the CSR and CSI switching control signals to jointly and concurrently regulate the DC link current;

wherein the DC link current control component is operative in a second mode to cause the grid side control component to exclusively regulate the DC link current.

11. The WECS of claim 10, wherein the DC link current control component is operative in a second mode to cause the grid side control component to provide the CSI switching control signals to regulate the DC link current.

12. The WECS of claim 10, wherein the CSC further comprises a feedback system operatively coupled with the intermediate circuit and providing at least one feedback value or signal to the switch control system indicative of a voltage in the intermediate circuit, wherein the DC link current control component is operative to selectively enter the first mode based at least in part on the at least one feedback value or signal.

13. The WECS of claim 12, wherein the DC link current control component is operative to selectively enter the first mode when the voltage across the at least one inductance is greater than a maximum DC link voltage control range of the grid side control component.

14. A method for operating a current source converter (CSC) to convert input electrical power to output electrical power in a wind energy conversion system (WECS), the method comprising:

receiving input electrical power from a generator with a rotor coupled directly or indirectly to a wind-driven prime mover at an input of a current source converter (CSC), the CSC having an intermediate circuit with at least one inductance;

selectively coupling the input to the intermediate circuit using a current source rectifier (CSR) of the CSC to convert input power from the generator to create a DC link current in the intermediate circuit;

selectively coupling the intermediate circuit to the output using a current source inverter (CSI) of the CSC to convert the DC link current to provide output electrical power to a power grid;

operating the CSR and the CSI in a first mode to jointly and concurrently regulate the DC link current; and operating the CSI in a second mode to exclusively regulate the DC link current.

15. The method of claim 14, comprising selectively entering the first mode based at least in part on at least one feedback value or signal from the intermediate circuit.

16. The method of claim 15, comprising selectively entering the first mode when a voltage across the at least one inductance is greater than a maximum DC link voltage control range of the CSI.

* * * * *